Aug. 18, 1936.  R. F. HALL  2,051,703
AIRPLANE SEAT
Filed Aug. 29, 1931   2 Sheets-Sheet 1
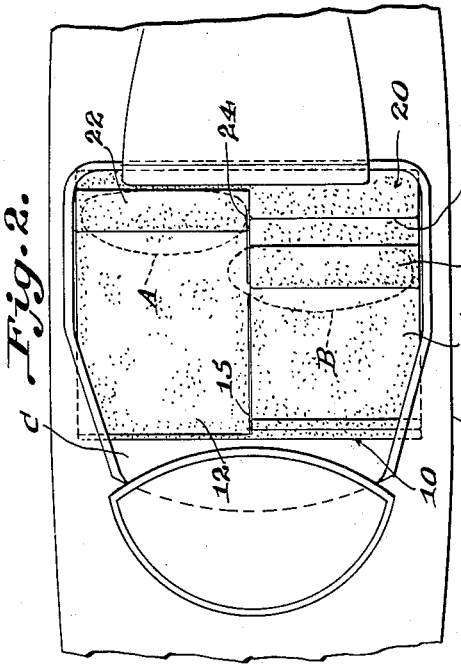
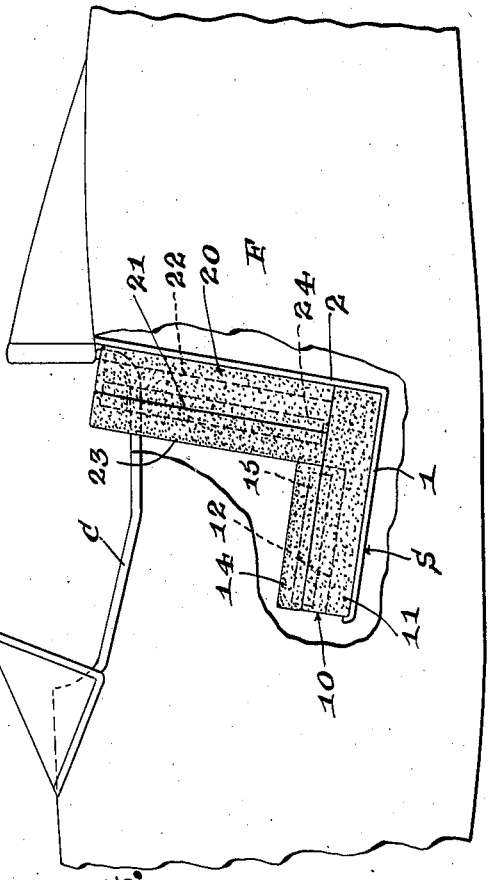
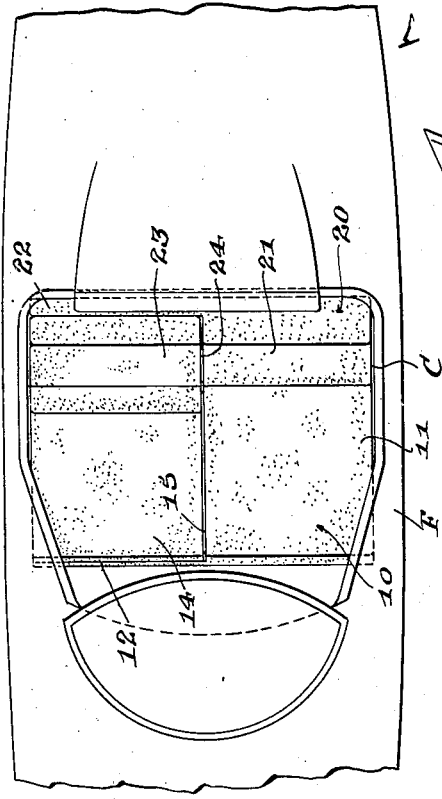
Inventor
Randolph F. Hall
By Albert E. Peck
Attorney Aug. 18, 1936.  R. F. HALL  2,051,703
AIRPLANE SEAT
Filed Aug. 29, 1931  2 Sheets-Sheet 2

Randolph F. Hall
Inventor

By
Attorney

Patented Aug. 18, 1936

2,051,703

UNITED STATES PATENT OFFICE 2,051,703

AIRPLANE SEAT

Randolph F. Hall, Rochester, N. Y.

Application August 29, 1931, Serial No. 560,171

9 Claims. (Cl. 155—130)

This invention relates to certain improvements in airplane seats; and the nature and objects of the invention will be readily recognized and understood by those skilled in the art to which it relates in the light of the following explanation and detailed description of the accompanying drawings illustrating what I at present consider as the preferred embodiments or mechanical expressions of my invention from among various other forms, arrangements, designs, combinations and constructions of which the invention is capable within the spirit and the scope thereof.

The particular aircraft problem for which I offer my present invention as one possible solution, is encountered in providing for a range of adjustment and flexibility in the seating accommodations in aircraft bodies to meet the requirements of different heights, widths, arm and leg lengths, and other size characteristics, of individual occupants, in order to obtain a maximum of ease and comfort for, and a minimum of interference between, the occupants in seated positions. The problem and its attendant difficulties are especially met with in the smaller sizes of aircraft bodies where the occupant space, cabin, or cockpit, is necessarily limited and restricted in size, such as in the smaller types of airplanes having a fuselage cockpit with a side by side seating arrangement therein.

With a side by side seating arrangement in a limited or relatively small cockpit or other occupant space, difficulty and discomfort are experienced by the occupants, especially where one or more are of large size, through shoulder and arm interference, which in the case of one of the occupants being the pilot is not only uncomfortable but a possible danger. If the seats are designed for occupants of average height and arm and leg length, a person over or under such average is not completely comfortable and at ease, and where the pilot's controls are located for such an average, one outside of the average is materially inconvenienced in handling and operating such controls to pilot the airplane.

Heretofore, to meet the foregoing conditions, seats have been made adjustable both vertically and forwardly and rearwardly, but such adjustable seats with their added structural and mechanical complications, and increased weight and cost, are not adapted to mounting in and forming side by side seating arrangements for the smaller types of airplane bodies or fuselages where space is very restricted and weight must be kept down. The adjustable types of seats further do not lend themselves to incorporation into and as a strengthening and bracing portion of the body or fuselage structure, which for weight and strength purposes is a highly desirable function to be performed by the seat structure in certain types and designs of small airplane body or fuselage construction.

A broad general object of my invention is to provide a design and arrangement of seat cushion or seat upholstery by which an adjustment and regulation of the seated position of an occupant or occupants can be readily and quickly made, and without adjustment of the seat structure proper, so that, such structure can form a bracing and stiffening portion of the body or fuselage structure in which mounted and of which it forms a part.

Another object of the invention is to provide a cushion or upholstery unit particularly adapted to side by side seating arrangements, by which the back and/or the vertical positions or locations of the occupants can be varied and adjusted to stagger or misalign the occupants' shoulders and give the occupants greater freedom of movement and increased comfort, as well as more comfortable leg positions with greater control ease and comfort for a pilot occupant.

A further object of the invention is to provide a design of seat cushion as a single unit for the bench types of side by side seats employed in airplane bodies or fuselages, by which cushion the back locations of the side by side occupants can be offset or staggered when desired, to stagger the ocupants' shoulders and reduce occupant interference, and thereby enable a reduction in length of the seat and width of cockpit space required to comfortably seat side by side occupants.

Another object of the invention is to provide a single unitary cushion or upholstery unit for side by side bench type seat structures, in which unit, a section or sections of the cushion back and/or bottom forming portions are swingable or foldable onto and over the adjacent seat back and/or bottom forming portion, respectively, of the unit, to thereby build out and move forwardly the back position for one of the seats while moving rearwardly the back position for the adjacent seat; or in the case of the seat bottom formed by the cushion unit, to raise the bottom position for one seat while lowering the position or location of the bottom for the adjacent seat.

It is a further object of the invention to provide a single cushion or upholstery unit for side by side seating arrangement, so as to eliminate the necessity for a plurality of individual seat cushions, which seat cushion unit is of simple design and construction to embody and carry out the hereinbefore referred to seat back and/or bottom location regulation and adjustment, and which is adapted to various types of construction to form a flotation unit for service as a life preserver.

With the foregoing general objects and results in view, as well as certain others which will be readily recognized from the following explanation, the invention consists in certain novel features in design and construction and in combinations and arrangements of parts, as will be more fully and specifically referred to and pointed out hereinafter.

Referring to the accompanying drawings:

Fig. 1 is a top plan view, more or less diagrammatic, of a portion of an airplane fuselage having an open cockpit therein and a bench type side by side seat structure, with back and bottom cushions of my invention mounted on and in the seat structure.

Fig. 2 is a view similar to Fig. 1, but with the back cushion section and bottom cushion section swung over onto adjacent cushion portions respectively, to stagger or misalign the adjacent seat back and seat bottom locations for the side by side seats.

Fig. 3 is a view in side elevation of the fuselage of Figs. 1 and 2, with a portion of the side wall of the fuselage broken away to show in end elevation, the seat bottom and back cushions with their respective swingable sections in the positions of Fig. 2.

Figure 4:
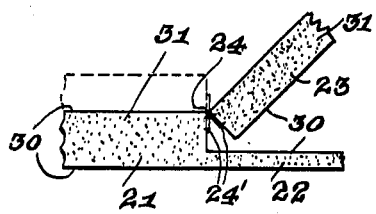
Fig. 4 is a detail sectional view through a portion of a cushion of the invention to show the construction thereof and the mounting of the swingable section thereon, the swingable section being shown in partially swung position by full lines, and in position swung over onto the adjacent cushion portion by dotted lines.

Specific application of the features of the cushions of my invention, to the conditions encountered in a small type fuselage having an open cockpit with a bench type seat structure providing side by side seats, is disclosed in Figs. 1, 2, and 3 of the drawings. This specific application of the invention and the particular embodiment of the cushions to meet the conditions and requirements there encountered, serve purely by way of example and not of limitation, for the purpose of explaining and illustrating the principles of my invention.

Referring to the specific example of Figs. 1, 2, and 3, an airplane body or fuselage F, a portion only of which is shown, is provided with the open cockpit C, and a bench type seat structure S is disposed within the cockpit C extending transversely across the fuselage to provide side by side seating accommodations for two occupants. The fuselage F, in this instance, is of the small airplane type, say of monocoque type of construction, and the seat structure S, which includes the preferably metal seat bottom 1 and seat back 2 making up a structure of the so-called bench type, is rigidly built-in and forms a transverse bracing and strengthening part of the body structure. With such a seating arrangement in a limited and restricted space cockpit C of a small airplane type fuselage, cramping of and interference between the side by side occupants takes place, especially when one or both occupants may be of large size.

By my invention, as expressed in the specific example of Figs. 1 to 3, I provide a bottom seat cushion 10 and a back seat cushion 20, which in this instance are separate units and removably mounted in position on and in the seat structure S in any suitable or desired manner. The bottom cushion 10 is mounted on and over the bottom 1 of the seat structure S and extends thereacross the full length of the seat, and the back cushion 20, in this specific example although not so limited, rests upon the bottom cushion in position over and against the seat back 2 extending across and for the full length of the seat back. Obviously, if desired, the back cushion can extend to the seat bottom 1 with the bottom cushion of a width to bear at its rear edge against the back cushion, instead of the arrangement shown in the instant example.

The seat back cushion 20 is formed with one half or side 21 thereof, of full cushion body thickness or depth, and with the opposite side or half 22 thereof, of reduced thickness or depth, thus initially providing at the forward side of the cushion the adjacent staggered and misaligned seat backs for the side by side seats, that is, one seat back spaced forwardly from the adjacent seat back, as will be clear by reference to Figs. 1 and 2 in particular. Now, this is one of the basic features of the invention by which a seat cushion, either bottom cushion or back cushion, is designed and formed to provide the side by side offset seat positions, to in the case of the back cushion 20, stagger the body and shoulders of the side by side occupants, as well as relatively adjusting the occupant's leg positions, or in the case of a bottom cushion, raise the seat bottom location for one occupant above the bottom location for the occupant in the adjacent seat.

In accordance with a further broad feature of the invention, a seat cushion, say the seat back cushion 20, is formed and provided with a movable section 23, referring to Figs. 1, 2, and 3 of the drawings, which normally is positioned on and over the reduced thickness or depth side 22 of cushion 20, and fills out or builds up this side of the cushion, with the section forward side substantially flush with and in the plane of the adjacent full thickness side of the cushion, as clearly shown by Fig. 1 of the drawings. The cushion section 23 is pivotally mounted or hinged to and along the inner vertical edge of the full thickness side 21 of the cushion by any suitable hinge mounting 24, this hinge mounting connecting and pivotally joining the adjacent inner vertical edges of section 23 and the full thickness half or side 21 of the cushion body. So mounted, the section 23 is laterally and horizontally swingable from normal position against the reduced thickness portion 22 of the cushion body, to a position over onto and against the full thickness side or portion 21, as shown by Figs. 2 and 3 of the drawings.

With the section 23 swung over onto side 21 of the cushion 20 to the position of Figs. 2 and 3, the seat back location is thus moved or re-located forwardly of the seat back location established by the reduced thickness side 22 of the cushion, and the bodies and shoulders of the occupants of the side by side seats are staggered and disaligned, as indicated by the dotted outlines A and B of Fig. 2. In such adjusted positions of the back locations of the side by side seats, interference between occupants is substantially reduced and the seating accommodations are regulated to more comfortably seat a large occupant or occupants. Further, by offsetting the seat back locations forwardly and rearwardly, the leg positions of the occupants can be more comfortably cared for, particularly where an occupant of large size or above average height.

The bottom cushion 10, in the specific arrangement of the examples of Figs. 1 to 3, follows the fundamental features of the back cushion 20, in that, one half or side 11 of the cushion body is of full thickness, while the adjacent side or half 12 thereof is of reduced thickness (see Fig. 3). A swingable section 14 is pivotally connected to the inner edge of the full thickness side 11 of bottom cushion 10 by a hinge mounting 15, similar to mounting 24 for back cushion section 23, and is swingable from normal position on reduced thickness portion 12, to position on and over the full thickness portion 11 of the cushion body (see Fig. 3).

In order to prevent interference with cushion back section 23, the swingable section 14 does not extend the full fore and aft width of depth of cushion 10, but terminates spaced from the rear edge of cushion 10 a distance equal to the combined thickness of back cushion 20 and the swingable section 23 thereof. Thus, with back section 23 swung onto side 21 of the back cushion 20, section 14 of bottom cushion 10 can be swung onto the side 10 of the bottom cushion without interference from cushion section 23, as will be clear by reference to Fig. 3 of the drawings in particular.

By the use of bottom cushion 10 and its swinging cushion section 14, the vertical positions of the seat bottoms for the side by side occupants can be regulated, with one seat bottom raised, while the adjacent seat bottom position is lowered; or both seat bottoms can be located at the same height by swinging section 14 to normal position on reduced thickness portion 12 of the bottom cushion.

If desired, only the back cushion 20 need be employed, a conventional bottom cushion or cushions being used on the seat bottom, or only the bottom cushion 10 utilized with conventional back cushions or cushion. Instead of the design of bottom cushion 10 of the specific example, a bottom cushion similar to back cushion 20 can be used. A back or bottom cushion of the form of cushion 20 can be reversed to place the swinging seat position regulating section thereof at either of the side by side seats desired, as may be found expedient for each particular seating arrangement.

The cushions, including the cushion sections can be constructed and made up in accordance with conventional cushion construction. For example, referring to Fig. 4 of the drawings, a fabric, leather, rubber, or suitable flexible material covering is provided forming the cushion body and swingable section, walls 30, with any suitable stuffing or filling material 31 such as generally used for the purpose. Preferably, the filling is such as to form a flotation unit of the cushion, which can then be utilized as a life preserver in the event of a water landing with an airplane equipped with such a seat cushion. If desired, seat or upholstery springs (not shown) of conventional design and mounting can be included with the cushions. Also, the invention contemplates a deflatable pneumatic type of cushion with proper valves, designed to embody the broad seat back and/or bottom position adjusting features, as hereinbefore described.

The hinge mountings 15 and 24, for the sections 14 and 23 of the bottom and back cushions 10 and 20 of Figs. 1 to 3, are similar and illustrated in Fig. 4, by the hinge mounting 24, which consists of a strip or length of flexible material, such as leather or the like, folded along its longitudinal center to form the opposite flaps or leaves 24', which are suitably secured, as by stitching, to the adjacent inner edge of cushion body portion 21 and inner edge of cushion section 23, respectively. Preferably, although not essentially the hinge 24 extends substantially the full length of the cushion, from front to rear thereof. Where cushion construction and materials, or other considerations, make other forms and arrangements of swinging or hinge mountings for the cushion sections desirable, they may be employed within the scope of the invention.

Figure 5:
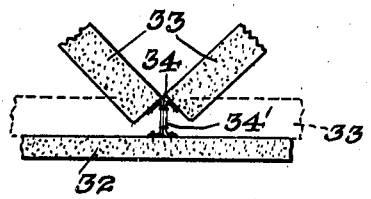
Fig. 5 is a detail view in section through a modified form of cushion having adjacent swingable sections, the sections being shown in normal positions by dotted lines and in partially outwardly swung positions by full lines.

A form of cushion of the invention is disclosed in Fig. 5 of the accompanying drawings, as embodying the relatively thin cushion body 32, and the adjacent swingable, side by side seat cushion defining sections 33, pivotally joined along their adjacent inner edges by the hinge mounting 34, which mounting 34 is secured to the cushion body 32 and fastens the swinging sections in position on the body. Thus, by this arrangement, either section 33 may be swung over onto the other, to thereby increase the overall thickness of either side by side seat cushion, while reducing the overall thickness of the adjacent seat cushion, in order, in the case of a back cushion to stagger the seat back locations, and in the case of a bottom cushion, to raise either seat bottom location with respect to the bottom location of the adjacent seat.

While any form of hinge mounting may be employed for pivotally or foldably connecting the swinging sections 33 together, and for securing the sections to the cushion body, the mounting 34 is a satisfactory one for the purpose. Such mounting 34 includes strips 34' of leather or other suitable flexible material, sewed, riveted or otherwise secured together to form opposite edge, outwardly extended flaps, with the opposite flaps at one edge secured to the adjacent cushion sections 33, respectively, and the flaps at the opposite edge secured to the cushion body 32, as will be clear by reference to Fig. 5 of the drawings.

Figure 6:
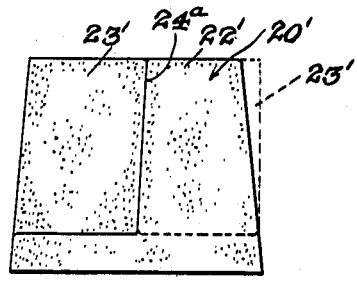
Fig. 6 is a view in front elevation of a modified form of seat back cushion with the top of the cushion of less width than the bottom, and the fold axis of the foldable or swingable section inclined from the cushion center line.

A form of back cushion 20' is shown in Fig. 6 of the drawings, having the top of the cushion of less width than the bottom width of the cushion, for fitting into certain types of side by side seat structures. The seat back location adjusting section 23' of this cushion has its fold line 24a or axis of swing inclined upwardly and inwardly from the vertical center line of the cushion. This forms cushion section 23' of greater width at the top portion thereof, than the top portion of the adjacent full thickness side 22' of the cushion, so that the section when swung over cushion body side 22, takes the dotted line position shown in Fig. 6. The swinging section 23' of cushion 20', also, in the example shown terminates spaced a distance above the lower edge of the cushion body, to permit use with a seat bottom cushion without interference with the swinging section, as will be readily apparent.

Figure 7:
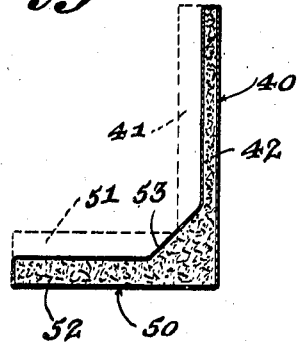
Fig. 7 is a vertical section through a cushion providing a unitary, combined seat back and seat bottom cushion, the section being taken through the reduced depth or thickness of the side portion of the unit with the bottom and back cushion sections swung and folded over on the adjacent cushion portion, and the folded over positions of the sections being indicated in dotted outline.
Figure 8:
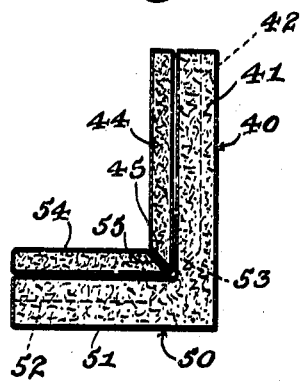
Fig. 8 is a sectional view through the full depth side portion of the cushion unit of Fig. 7, and the foldable sections thereof in positions folded thereover.

A further form of my invention is illustrated in Figs. 7 and 8 of the drawings, as providing a combined seat back and seat bottom cushion or upholstery unit. In such form, the cushion body includes the unitary back cushion 40 and bottom cushion 50, with the back cushion having the full body thickness side or half 41 and the reduced thickness side or half 42, while the bottom cushion 50 full thickness side or half 51 and the reduced thickness side or half 52. In the specific example hereof, the reduced thickness of sides or halves 42 and 52 of the back and bottom cushions of the unit, are joined or connected by the sloping wall 53 which is inclined upwardly and rearwardly from bottom cushion side portion 52, to back cushion side portion 42, (see Fig. 7).

A swingable seat back position adjusting section 44 is pivotally mounted to the inner edge of back cushion side portion 41 and in normal position fits over and builds up reduced thickness side portion 42, and a similar bottom cushion section 54 is pivotally mounted to the inner edge of the full thickness side portion 51 of bottom cushion 50. The back cushion section 44 is swingable over onto full thickness side 41 to vary or change the relative back locations of the side by side seats, and the bottom cushion section 54 is swingable from its normal position, to position over onto the adjacent full thickness side portion 51 of bottom cushion 50, to change the relative vertical positions of the side by side seat bottoms. The foregoing seat back and bottom changing positions of cushion sections 44 and 54, are shown clearly in Fig. 8 of the drawings. In order to eliminate interference between the swinging sections 44 and 54 when both are swung to seat back and bottom adjusting positions of Fig. 8, the rear edge 55 of bottom cushion section 54 is beveled or downwardly and rearwardly inclined, and the lower edge 45 of seat back cushion section 44 is correspondingly beveled, so that these adjacent beveled edges will substantially meet and abut.

Figure 10:
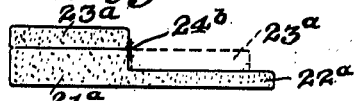
Fig. 10 is a top plan view, more or less diagrammatic, of a modified arrangement of the back cushion of Fig. 1, in which the fold axis of the swinging section is to one side of the cushion center line and the swinging section and full depth side of the cushion narrower than the reduced depth side of the cushion body.

In Fig. 10 of the drawings, a slight modification of a seat back (or bottom) cushion of the type of cushion 20 of Figs. 1 to 3, is shown, in which modification, the reduced thickness side portion 22a is less in width than the full thickness portion 21a, so that the fold or hinge line 24b for the swinging section 23a is spaced off the vertical or transverse center line of the cushion. With this arrangement, the swinging section 23a is of the same width as the portion 21a of the cushion, and when in normal position on the reduced thickness side portion 22a does not extend over the full width of cushion portion 22a, as shown in dotted outline in Fig. 10. The cushion of Fig. 10 may thus serve to provide an oversize width of cushion seat back portion or side 22a for an occupant of large size and body and shoulder width.

Figure 9:
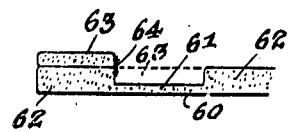
Fig. 9 is an edge elevation of a cushion of the invention formed with a centrally located folding section for a triple side by side seating arrangement.

In the foregoing examples of cushions embodying the invention, the cushions illustrated are for side by side seating arrangements of two seats, but cushions are contemplated for any desired number of seats, and as an example, I have shown a cushion 60 in Fig. 9 of the drawings for carrying out the invention with an arrangement of three side by side seats. Cushion 60 may be considered as either a seat back or seat bottom cushion, and is formed with an intermediate portion 61 of reduced thickness and opposite side portions 62 of full cushion body thickness. A swinging section 63 is normally fitted between portions 62, as shown by dotted lines in Fig. 9, to build-up this portion of the cushion substantially flush with portions 62, and is suitably pivoted, as by hinge mounting 64, to the inner edge of a full thickness portion 62. Section 63 is thus foldable over onto a full thickness portion 62 to the position shown in full lines, with cushion 60 then presenting three seat locations (seat back or bottom) staggered or misaligned with respect to each other.

Attention is here directed to the fact that the invention is not limited or restricted to the exact seat structure of the given example, or to open-cockpit seats, but is equally well adapted to seats in cabin aircraft or to other vehicles and seat locations, and the invention includes any such other seat adaptations of the cushions. Further, if desired, instead of the removable types of cushions, the several features of the invention may be embodied in the permanent or semi-permanent forms of seat cushions or upholstery.

A cushion of the invention can be utilized for a single seat, such as in an airplane having a single occupant cockpit where sufficient space is available for the foldable cushion, in order to change or adjust cockpit proportions to meet individual requirements. Further, cushions of the invention may be advantageously employed with seats of the adjustable types to increase the range of adjustment positions, and various occupant position combinations are possible by different arrangements of cushions embodying the principles of the invention, as will be readily understood.

Also various other variations, modifications, changes, substitutions, eliminations, and additions may be resorted to without going beyond the spirit and scope of my invention, and hence I do not desire to limit myself in all respect to the exact and specific disclosures and arrangements of the example here presented and described.

What I claim is:

1. A bench type seat structure including a seat bottom and a seat back providing a side by side seating arrangement, in combination with a seat cushion on the seat structure providing adjacent side by side seat forming portions for individual side by side seat occupants, each seat forming portion of the cushion including a seat bottom forming section and a seat back forming section, and adjacent side by side seat forming portions of the cushion offset both at the seat bottom forming sections and the seat back forming sections thereof.

2. A vehicle seat structure providing a side by side seating arrangement, in combination with a seat bottom and seat back cushion mounted in said seat structure and formed at the side by side seat portions of different seat bottom and back thicknesses to provide side by side seat portions to offset bodies of the respective side by side seat occupants vertically and forwardly.

3. A seat cushion unit for side by side seating arrangements, said cushion unit including a seat bottom forming portion and a seat back forming portion, and the said bottom and back portions of the cushion unit formed of different thickness at the respective side by side seat forming portions thereof.

4. A side by side seat cushion unit embodying a seat back cushion and a seat bottom cushion, a swingable cushion section on the back cushion for adjusting the seat back portions of the side by side seats, respectively, and a swingable cushion section on the bottom cushion for adjusting the vertical positions of the side by side seat bottoms, respectively, of the cushion.

5. A cushion unit for side by side seating arrangements, embodying a back cushion and a bottom cushion, the back cushion formed of different thicknesses at the side by side seat portions, respectively, to offset the seat back positions, and the bottom cushion formed of different thicknesses at the respective side by said seat portions to place the seat bottom portions at different levels relative to each other.

6. A side by side seat cushion unit embodying a combined bottom cushion and back cushion, a section of the bottom cushion at one side thereof foldable laterally over onto the adjacent side thereof to vertically offset the bottom portions of the adjacent side by side seats, and a section of the back cushion on the side thereof corresponding to the side of the bottom cushion providing a foldable section, also foldable laterally over onto the adjacent side of the back cushion to horizontally offset the back portions of the adjacent side by side seats, respectively.

7. A seat cushion unit for side by side seating arrangements, embodying a base cushion having one side thereof of reduced thickness relative to the laterally adjacent side of the cushion, and a cushion section on the reduced thickness side swingably connected to the base cushion and swingable laterally from normal position on the reduced thickness side over onto the adjacent seat portion to increase the cushion thickness at such portion and relatively adjust the positions of the side by side seat forming portions of the cushion.

8. A seat cushion unit for side by side seating arrangements including, a base cushion providing adjacent side by side seat forming portions, a cushion section normally positioned on each of said adjacent seat forming portions of the base cushion, said adjacent cushion sections providing side by side seat forming portions of the cushion unit and swingably connected to each other along their adjacent edges whereby each cushion section is laterally swingable over onto the other, and means securing said swingably connected sections to the base cushion.

9. A seat cushion unit for side by side seating arrangements including a base cushion providing adjacent side by side seat forming portions, a cushion section normally positioned on each seat forming portion of the base cushion, said adjacent cushion sections providing side by side seat forming portion of the cushion unit, a hinge connection coupling the adjacent side by side edges of said cushion sections whereby either section is swingable laterally over onto the adjacent cushion section, and said hinge connection secured to the base cushion to maintain the cushion sections in operative position thereon.

RANDOLPH F. HALL.